United States Patent
Villardi et al.

(10) Patent No.: US 8,909,241 B2
(45) Date of Patent: Dec. 9, 2014

(54) WIRELESS DEVICE AND COMMUNICATION METHOD

(75) Inventors: Gabriel Porto Villardi, Koganei (JP); Zhou Lan, Koganei (JP); Chin-Sean Sum, Koganei (JP); Chen Sun, Koganei (JP); Tuncer Baykas, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 63 days.

(21) Appl. No.: 13/883,248

(22) PCT Filed: Oct. 28, 2011

(86) PCT No.: PCT/JP2011/006067
§ 371 (c)(1),
(2), (4) Date: May 2, 2013

(87) PCT Pub. No.: WO2012/060080
PCT Pub. Date: May 10, 2012

(65) Prior Publication Data
US 2013/0217406 A1    Aug. 22, 2013

(30) Foreign Application Priority Data
Nov. 5, 2010   (JP) .................................. 2010-249198

(51) Int. Cl.
*H04W 36/00* (2009.01)
*H04M 11/04* (2006.01)
*H04W 24/00* (2009.01)
*H04W 72/04* (2009.01)
*H04W 16/14* (2009.01)

(52) U.S. Cl.
CPC .......... *H04W 72/0453* (2013.01); *H04W 16/14* (2013.01)

USPC ..................... 455/452.1; 455/443; 455/404.2; 455/456.1

(58) Field of Classification Search
CPC . H04W 72/0473; H04W 16/14; H04W 16/10; H04W 4/028; H04W 64/00; H04W 52/244; H04W 92/20; H04J 11/005
USPC ........... 455/404.2, 456.1, 443, 451–454, 429, 455/427; 370/321, 329–331, 341, 443, 468
See application file for complete search history.

(56) References Cited

U.S. PATENT DOCUMENTS

| | | | | |
|---|---|---|---|---|
| 5,920,819 | A | * | 7/1999 | Asanuma ....................... 455/447 |
| 8,559,961 | B2 | * | 10/2013 | Boudreau et al. ............. 455/447 |
| 2002/0006795 | A1 | * | 1/2002 | Norin et al. ................... 455/429 |
| 2006/0041556 | A1 | | 2/2006 | Taniguchi et al. | |

FOREIGN PATENT DOCUMENTS

| | | |
|---|---|---|
| EP | 1 546 937 | 6/2005 |
| EP | 2 232 893 | 9/2010 |
| JP | 2004-094397 A | 3/2004 |
| JP | 2007-184850 A | 7/2007 |
| JP | 2008-211583 A | 9/2008 |
| WO | WO 2004/021218 A2 | 3/2004 |
| WO | WO 2009/088823 A2 | 7/2009 |

OTHER PUBLICATIONS

International Preliminary Report on Patentability (IPRP) dated May 16, 2013 (in English) issued in International Application No. PCT/JP2011/006067.
"Digital Dividend: Geolocation for Cognitive Access": Ofcom: Nov. 17, 2009: pp. 1-29 (in English).
International Search Report (ISR) dated Dec. 6, 2011 (and English translation thereof) issued in parent international Application No. PCT/JP2011/006067.

* cited by examiner

*Primary Examiner* — Nizar Sivji
(74) *Attorney, Agent, or Firm* — Holtz, Holtz, Goodman & Chick PC

(57) ABSTRACT

A wireless device and a communication method, which enable a position of the wireless device to be known and enable a frequency which does not interfere with that of another wireless station to be selected, are provided. A wireless device belonging to a second wireless system in which a frequency band to be used overlaps with that of a first wireless system, and a priority with which the overlapping frequency band is used is lower than that of the first wireless system, the wireless device includes: a location receiving unit receiving location information formed of a place name and indicating a location of the wireless device; a geographic coordinate acquiring unit acquiring, based on the location information, geographic coordinates including latitude and longitude corresponding to the location information; and a frequency setting unit accessing a frequency server in which a frequency assigned to a wireless device belonging to the first wireless system and geographic coordinates including latitude and longitude related to a position of the wireless device are stored by being corresponded to each other, by using the geographic coordinates acquired by the geographic coordinate acquiring unit, and acquiring at least one of a frequency that is not assigned to the wireless device belonging to the first wireless system and a frequency which is not at risk of interfering with that of the wireless device, to set the frequency as a transmission/reception frequency.

9 Claims, 3 Drawing Sheets

WIRELESS DEVICE AND COMMUNICATION METHOD

TECHNICAL FIELD

The present invention relates to a wireless device and a communication method which previously prevent an interference in wireless systems sharing a frequency band to be used.

BACKGROUND ART

In industries related to radio waves, a development of systems using TVWS (TV White Space: white space for television) is being advanced. In order to realize a communication using the TVWS, there is a need to modify existing wireless communication systems, and to make operations of these systems to be conformed to laws and regulations related to radio waves.

As a condition required in the system using the TVWS, there can be cited, for example, a possession of function of selecting a frequency (band) which does not overlap with a frequency band used by a wireless station (TV, in this case) having a high priority with which the TVWS is used (or a frequency band which is assigned to the wireless station). This is for avoiding an interference of communication of the wireless station which is licensed and has a high priority in terms of radio wave regulating.

In order to realize the function as above, one option to be required is to prepare a database recording a state of using radio waves in the TVWS, particularly, a state of assignment of radio waves in a wireless station of TV and the like with high priority (frequency database). Normally, the frequency database is created by an authority of radio wave regulating, and is provided to the public. The frequency database manages, regarding a predetermined frequency band of TV and the like, an ID of licensed wireless station (broadcast station), a frequency (band) assigned to the wireless station, positional information of the wireless station and the like, and the positional information of the wireless station is often represented as position coordinates formed of latitude, longitude and the like. When the system using the TVWS selects a frequency to be used, it is possible to previously avoid the frequency (band) licensed to the wireless station with high priority by accessing the frequency database as above.

In order to judge the presence/absence of the wireless station with high priority (or the presence/absence of possibility of giving an interference to the wireless station) by utilizing the frequency database, there is a need to know a positional relationship between the wireless station and a system that uses the TVWS. However, as the system that uses the TVWS, a low power system which is not required to be licensed is assumed, so that there is a problem that it is difficult to know the positional relationship in advance.

CITATION LIST

Non-Patent Document

Non-Patent Document 1: Ofcom, Independent regulator and competition authority for the UK communications industries, Digital Dividend: Geolocation for Cognitive Access, [online], Ofcom 2009, [retrieved on Oct. 7, 2010], Retrieved from the Internet: <URL: http://stakeholders.ofcom.org.uk/binaries/consultations/cogacce ss/summary/cogaccess.pdf>

SUMMARY OF INVENTION

As described above, the conventional wireless device and communication method have a problem that it is difficult to judge the presence/absence of the wireless station with high priority, since it is not possible to know the position of the wireless device. An embodiment to be described hereinbelow is made to solve such problems, and an object thereof is to provide a wireless device and a communication method, which enable a position of the wireless device to be known and enable a frequency which does not interfere with that of another wireless station to be selected.

In order to solve the above-described problems, a wireless device according to an embodiment being a wireless device belonging to a second wireless system in which a frequency band to be used overlaps with that of a first wireless system, and a priority with which the overlapping frequency band is used is lower than that of the first wireless system, the wireless device includes: a location receiving unit receiving location information formed of a place name and indicating a location of the wireless device; a geographic coordinate acquiring unit acquiring, based on the location information, geographic coordinates including latitude and longitude corresponding to the location information; and a frequency setting unit accessing a frequency server in which a frequency assigned to a wireless device belonging to the first wireless system and geographic coordinates including latitude and longitude related to a position of the wireless device are stored by being corresponded to each other, by using the geographic coordinates acquired by the geographic coordinate acquiring unit, and acquiring, from the frequency band used by the second wireless system and overlapping with the frequency band used by the first wireless system, at least one of a frequency that is not as signed to the wireless device belonging to the first wireless system and a frequency which is not at risk of interfering with that of the wireless device, to set the frequency as a transmission/reception frequency.

According to the present invention, it is possible to provide a wireless device and a communication method, which enable a position of the wireless device to be known and enable a frequency which does not interfere with that of another wireless station to be selected.

DESCRIPTION OF EMBODIMENTS

Overview of Embodiment

Figure 1:
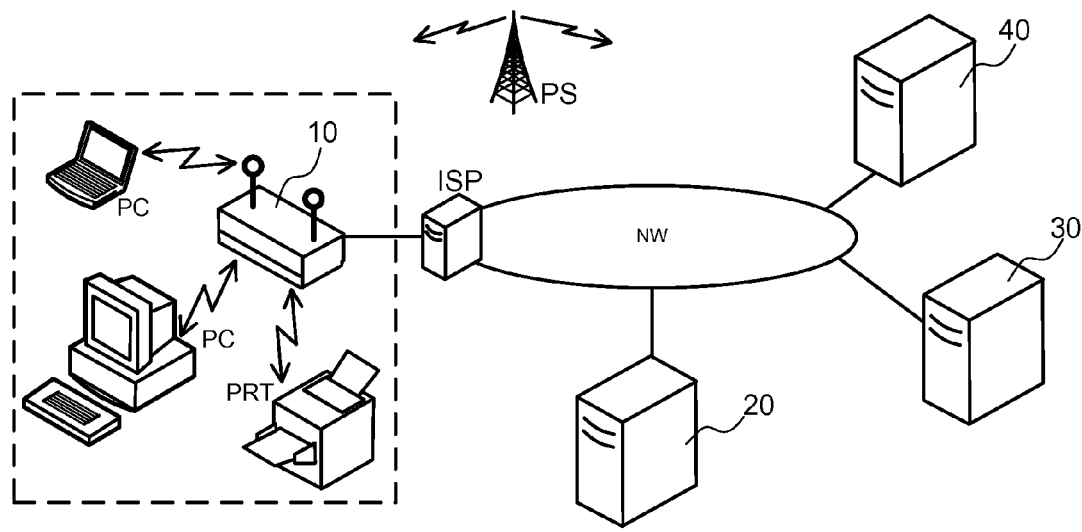
FIG. 1 is a conceptual diagram illustrating an outline of a wireless device and a system according to an embodiment.

Hereinafter, a wireless device and a system according to an embodiment will be described in detail with reference to the drawings. As illustrated in FIG. 1, the system of this embodiment has a wireless device 10, a geographic coordinate server 20, a frequency server 30, and a wireless station server 40, which are mutually connected by an external network NW such as Internet. In an example illustrated in FIG. 1, the wireless device 10 functions as an access point AP by which a personal computer PC and a printer PRT are accommodated as clients in LAN and wireless LAN (WLAN). The wireless device 10 is connected to the network NW via an Internet Service Provider ISP. Specifically, devices such as the personal computer PC and the printer PRT connected to the wireless device 10 via LAN or WLAN are connected to the external network NW through the wireless device 10 and the Internet service provider ISP.

The wireless device 10 which functions as the access point of WLAN uses a frequency band which overlaps with a frequency band assigned to a primary system PS. The primary system PS (wireless device belonging to a first wireless system) has a priority with which the frequency band is used, higher than that of the wireless device 10 (and the personal computer PC and the printer PRT as the clients which communicate with the wireless device 10), so that the wireless device 10 and its clients (wireless device belonging to a second wireless system) are in a state where they must not interfere with the primary system PS. In an example to be explained hereinbelow, explanation will be made by assuming that the primary system PS is a wireless system that transmits radio waves of television broadcasting.

When the wireless device 10 uses a frequency of frequency band assigned to the primary system PS (which is sometimes referred to as "channel", hereinafter), the wireless device 10 is required to previously know whether the primary system PS exists in a peripheral area thereof. The frequency server 30 in the embodiment manages identification information of the primary system PS, geographic positional information representing a position of the primary system PS by geographic coordinates including latitude, longitude, altitude and the like, and the frequency (band) assigned to the primary system PS, by making them correspond to one another. Specifically, when the wireless device 10 sends its geographic positional information to the frequency server 30, the identification information of the primary system PS, frequency information assigned to the primary system PS positioned in the periphery of the wireless device 10 and the like, are provided. The wireless device 10 can determine a frequency which does not interfere with that of the primary system PS and the like, by referring to the provided frequency information.

Meanwhile, when compared to the primary system PS which is officially licensed and to which the frequency is assigned, the wireless device 10 is a device whose scale is small and which is not required to be licensed. It can be considered that a user who uses such a device personally purchases the device and uses it at his/her home. It is unrealistic to make the user prepare geographic coordinates to be a query of the frequency server 30, regarding a position at which the wireless device 10 is used. Meanwhile, a GPS system is a system that provides geographic coordinates, but, it sometimes does not function well within doors such as one's home. Accordingly, the geographic coordinate server 20 in the embodiment provides geographic positional information accessible to the frequency server 30, based on positional information familiar to general users, formed of a place name, a house number, a postal code and the like. When the user inputs a location represented by a place name and the like, into the wireless device 10, it becomes possible that the wireless device 10 independently acquires geographic coordinates including latitude, longitude, altitude and the like (geographic positional information), and besides, it accesses the frequency server 30.

The frequency server 30 contributes to the prevention of interference with respect to the primary system PS, but, it does not contribute to that of interference between wireless devices whose frequency (band) to be used overlaps with that of the primary system PS and whose priority is lower than that of the primary system PS. The wireless station server 40 of the embodiment manages identification information of a wireless device whose priority is lower than that of the primary system PS, geographic positional information representing a position of the wireless device by geographic coordinates including latitude, longitude, altitude and the like, and a frequency (band) used by the wireless device, by making them correspond to one another. Specifically, when the wireless device 10 sends its geographic positional information to the frequency server 30, the identification information, frequency information to be used and the like of the wireless device positioned in the periphery of the wireless device 10 and whose priority is lower than that of the primary system PS, are provided. The wireless device 10 can determine a frequency which also does not interfere with that of the wireless device whose frequency to be used overlaps with that of the primary system PS and whose priority is low, by referring to the provided neighboring station information regarding the neighboring station.

As described above, the wireless device 10 according to the embodiment determines the frequency (band) to be used, in cooperation with the geographic coordinate server 20, the frequency server 30 and the wireless station server 40, so that it is possible to previously prevent the interference with respect to not only the primary system PS but also the neighboring wireless device.

Configuration of Embodiment

Figure 2:
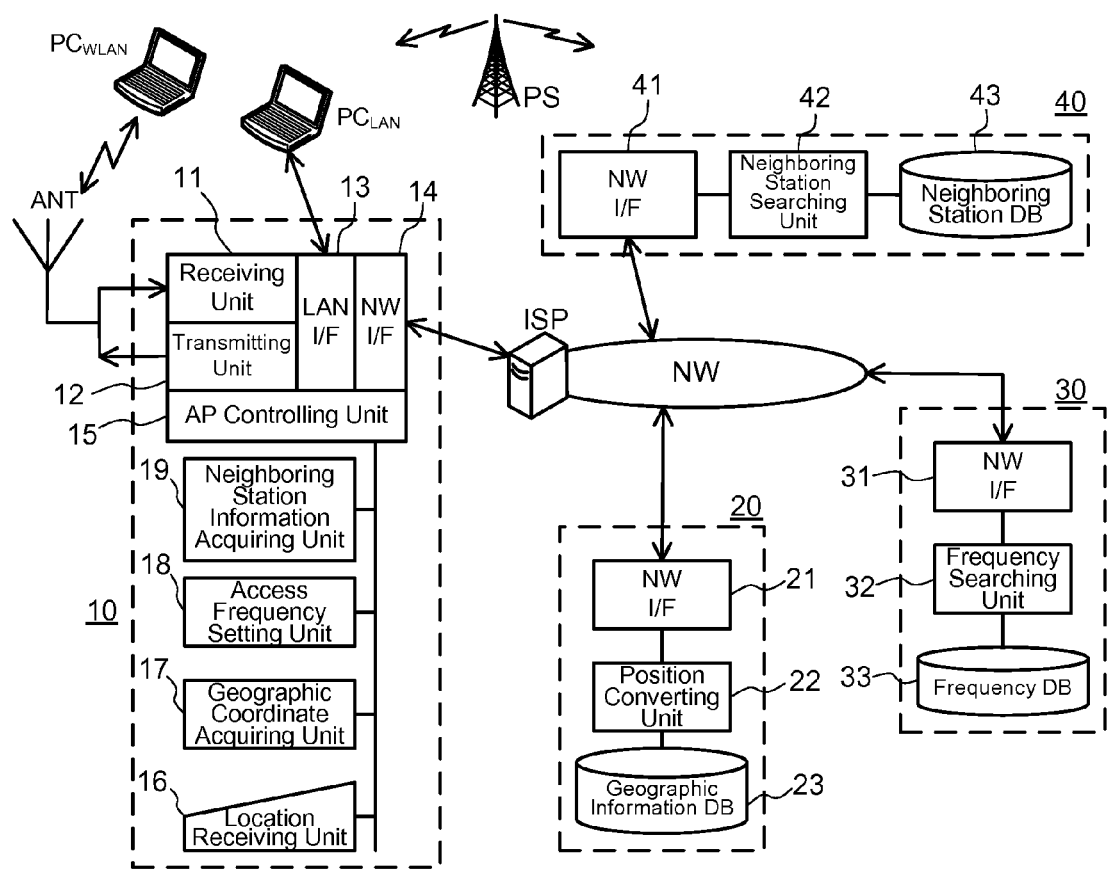
FIG. 2 is a block diagram illustrating a configuration of the wireless device and the system according to the embodiment.

Subsequently, a configuration of the wireless device 10 according to the embodiment will be described in detail, by referring to FIG. 2. The wireless device 10 in this embodiment includes a receiving unit 11, a transmitting unit 12, a LAN interface 13, a NW interface 14, and an access point controlling unit 15.

The receiving unit 11 receives a signal from a client via an antenna ANT, demodulates the signal through a predetermined method, and sends the resultant to another client via the LAN interface unit 13. Further, the receiving unit 11 receives a radio wave from a client via the antenna ANT, demodulates the radio wave through a predetermined method, and sends the resultant to the network NW via the NW interface unit 14. Meanwhile, information from a client $PC_{LAN}$, and the network NW is sent to the transmitting unit 12 via the LAN interface unit 13 and the NW interface unit 14, and the transmitting unit 12 converts the information into a wireless signal, and transmits the signal to a client $PC_{WLAN}$ of WLAN via the antenna ANT. The access point controlling unit (AP controlling unit) 15 controls the receiving unit 11, the transmitting unit 12, the LAN interface unit (LAN I/F) 13 and the NW interface unit (NW I/F) 14, to make the wireless device 10 function as an access point.

The receiving unit 11 and the transmitting unit 12 can be realized by using systems based on IEEE802.11 standard, for example. Note that at least a part of frequency band used by the receiving unit 11 and the transmitting unit 12 overlaps with a frequency band used by the primary system PS.

Further, the wireless device 10 in this embodiment includes a location receiving unit 16, a geographic coordinate acquiring unit 17, an access frequency setting unit 18, and a neighboring station information acquiring unit 19.

The location receiving unit 16 has a function of receiving, from a user, location information formed of a place name, a house number and the like indicating a position at which the wireless device 10 is used. The geographic coordinate acquiring unit 17 has a function of acquiring geographic coordinates (geographic position) including latitude, longitude, altitude and the like based on the location information received by the location receiving unit 16. The access frequency setting unit 18 has a function of determining a frequency (band) used by the receiving unit 11 and the transmitting unit 12 based on the geographic coordinates acquired by the geographic coordinate acquiring unit 17. The neighboring station information acquiring unit 19 has a function of acquiring information regarding another wireless device disposed in a periphery of the wireless device 10 and whose frequency (band) to be used overlaps with that of the wireless device 10 based on the geographic coordinates acquired by the geographic coordinate acquiring unit 17. The wireless device 10 can be realized by a 100 mW mode II device based on IEEE802.11, or the like, for example.

Next, a configuration of the geographic coordinate server 20, the frequency server 30 and the wireless station server 40, which are accessed by the wireless device 10 when determining the frequency and the like, will be described.

The geographic coordinate server 20 is a server that converts location information formed of a place name and the like including a name of prefecture, a name of city, ward, town or village, a house number and the like, and geographic coordinates including latitude, longitude and altitude. The geographic coordinate server 20 has a network interface (NW I/F) 21, a position converting unit 22 and a geographic information database (geographic information DB) 23. The network interface 21 is an interface connecting the geographic coordinate server 20 to the network NW. The geographic information database 23 is a database in which positional information formed of a place name and the like including a name of prefecture, a name of city, ward, town or village, a house number and the like, and geographic coordinates corresponding to the positional information are stored by being corresponded to each other. The position converting unit 22 is a server engine that searches corresponding geographic coordinates stored in the geographic information database 23 based on a query of the location information sent via the network interface 21, and gives a reply to an inquirer.

Specifically, the geographic coordinate server 20 has a function of giving the corresponding geographic coordinates in response to the query including the location information, as a reply. Note that it is also possible that the position converting unit 22 of the geographic coordinate server 20 judges whether or not the sent query including the location information indicates a reasonable place (whether or not it indicates a place existed on land, and the like, for example), to thereby judge whether or not the query is a false query. Alternatively, the query from the wireless device 10 reaches the geographic coordinate server 20 via the Internet Service Provider (ISP) and the network NW. Accordingly, it is also possible that the position converting unit 22 makes inquiries about the location information of the wireless device 10 with respect to the Internet Service Provider ISP, and compares and verifies a reply from the ISP and contents of the query, to thereby judge the authenticity or the presence/absence of falseness regarding the location information.

The frequency server 30 is a server that provides, based on geographic coordinates, frequency (band) information used by a primary system PS in an area corresponding to the geographic coordinates. The frequency server 30 has a network interface (NW I/F) 31, a frequency searching unit 32, and a frequency database (frequency DB) 33. The network interface 31 is an interface connecting the frequency server 30 to the network NW. The frequency database 33 is a database in which geographic coordinates formed of latitude, longitude, altitude and the like, and a primary system PS which is officially licensed and which exists in an area corresponding to the geographic coordinates and a frequency (band) used by the primary system PS, are stored by being corresponded to each other. The frequency searching unit 32 is a server engine that searches the primary system PS in the corresponding area and the frequency (band) used by the primary system PS stored in the frequency database 33 based on a query of the geographic coordinates sent via the network interface 31, and gives, as a reply, a frequency which is not assigned to the primary system PS or a frequency which is not at risk of interfering with that of the system to an inquirer.

Specifically, the frequency server 30 has a function of giving available frequency information of the corresponding area in response to the query including the geographic coordinates, as a reply. A size of the area given in response to the geographic coordinates is determined based on the presence/absence of possibility that the wireless device 10 interferes with the primary system PS. The frequency server 30 may search and reply, by uniformly setting a predetermined range of "within a 50-kilometer radius" or the like, for example, as the "corresponding area", or it may also individually perform calculation of interference based on a distance between the wireless device 10 and the primary system PS and their respective effective radiation powers, and then search and reply, by setting a range in which the possibility of interference becomes equal to or less than a predetermined possibility, as the "corresponding area".

The wireless station server 40 is a server that provides, based on geographic coordinates, information of another wireless station operated in an area corresponding to the geographic coordinates. The wireless station server 40 has a network interface (NW I/F) 41, a neighboring station searching unit 42 and a neighboring station database (neighboring station DB) 43. The network interface 41 is an interface connecting the wireless station server 40 to the network NW. The neighboring station database 43 is a database in which geographic coordinates formed of latitude, longitude, altitude and the like, and information of another wireless device which exists in an area corresponding to the geographic coordinates and whose frequency (band) to be used overlaps with that of the primary system PS, are stored by being corresponded to each other. The neighboring station searching unit 42 is a server engine that searches a wireless device in the corresponding area and a frequency (band) used by the wireless device stored in the neighboring station database 43 based on a query of the geographic coordinates sent via the network interface 41, and gives a frequency which is being used by another wireless device or a frequency which may cause interference, to an inquirer as a reply. The neighboring station database 43 may also store the geographic coordinates formed of latitude, longitude, altitude and the like, and information of another wireless device which exists in the area corresponding to the geographic coordinates, whose frequency (band) to be used overlaps with that of the primary system PS, and whose priority with which the overlapping frequency band is used is lower than that of the primary system PS, by making them correspond to each other.

Specifically, the wireless station server 40 has a function of giving the information of another wireless station using the frequency band which overlaps with that of the primary system PS in the corresponding area (or another wireless station using the frequency band which overlaps with that of the primary system PS in the corresponding area and whose priority with which the overlapping frequency band is used is lower than that of the primary system PS) in response to the query including the geographic coordinates, as a reply. A size of the area given in response to the geographic coordinates is determined based on the presence/absence of possibility that the wireless device 10 interferes with another wireless device (wireless device whose priority with which the frequency is used is lower than that of the primary system PS). The frequency server 30 may search and reply, by uniformly setting a predetermined range of "within a 50-kilometer radius" or the like, for example, as the "corresponding area", or it may also individually perform calculation of interference based on a distance between the wireless device 10 and another wireless device and their respective effective radiation powers, and then search and reply, by setting a range in which the possibility of interference becomes equal to or less than a predetermined possibility, as the "corresponding area".

Here, a configuration of the location receiving unit and the geographic coordinate acquiring unit according to the embodiment will be described in detail, by referring to FIG. 3.

Figures 3, 4:
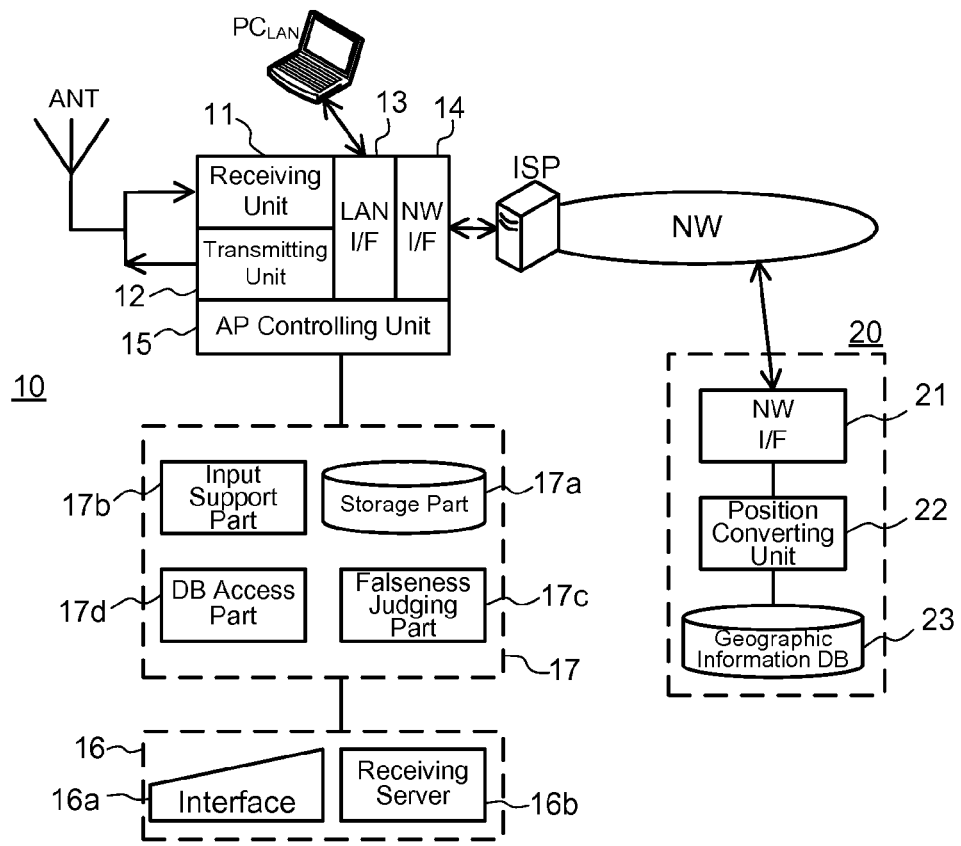
FIG. 3 is a block diagram illustrating a detailed configuration of a location receiving unit and a geographic coordinate acquiring unit according to the embodiment.
FIG. 4 is a diagram illustrating a state in which the location receiving unit according to the embodiment receives location information.
Figure 5:
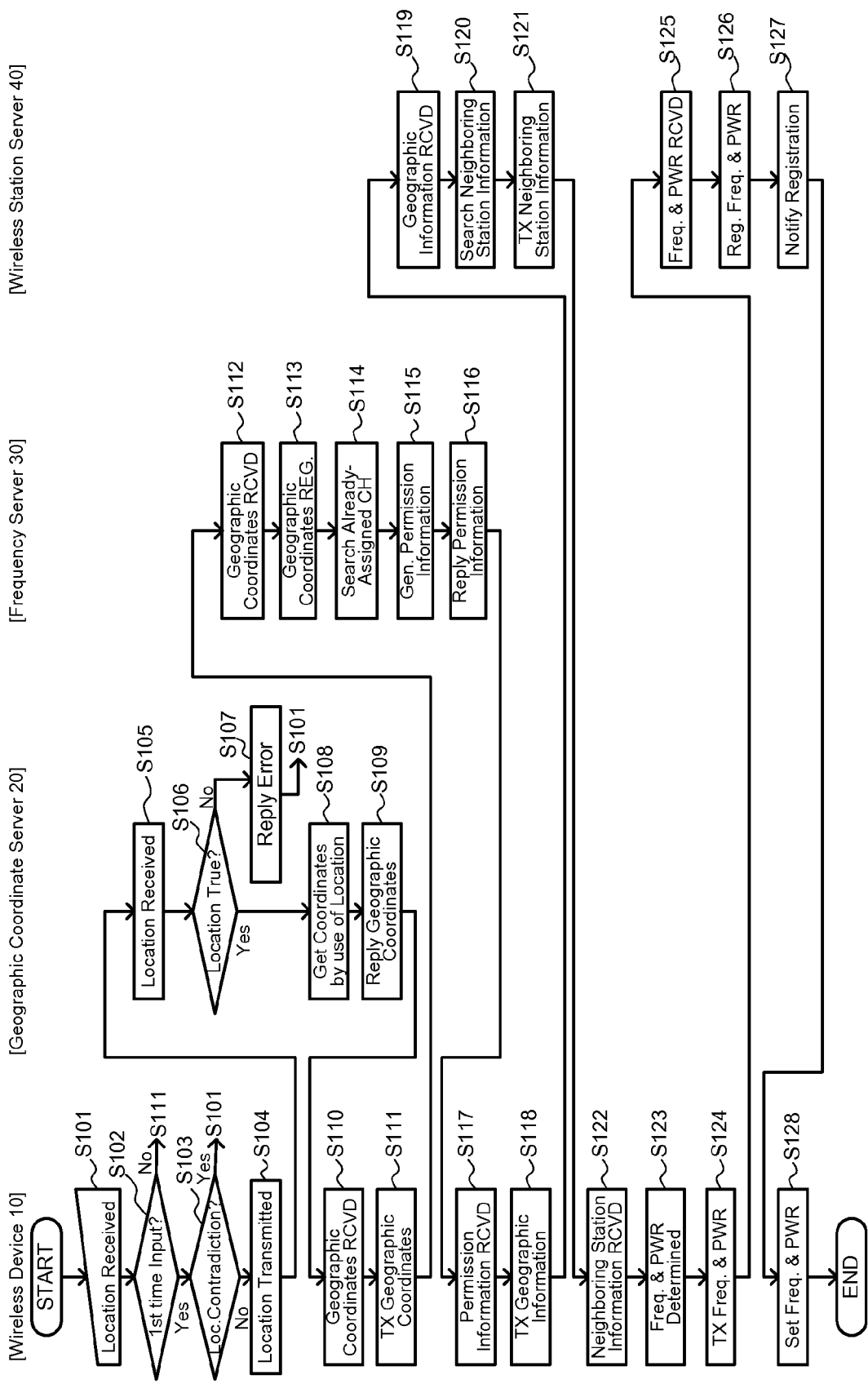
FIG. 5 is a flow chart illustrating an operation of the wireless device and the system according to the embodiment.

As illustrated in FIG. 3, the location receiving unit 16 of the embodiment has a (user) interface 16a and a receiving server 16b. The interface 16a is a user interface such as, for example, a switch, a keyboard, and a liquid crystal display device. The interface 16a has a function of receiving, from a user, various settings and the location information of the wireless device 10. The receiving server 16b is a server that communicates with the client $PC_{LAN}$ connected to the LAN interface unit 13, and receives, from the user, information regarding the various settings and the location of the wireless device 10 via the client $PC_{LAN}$. Specifically, the receiving server 16b operates to perform display to prompt the user to input a name of location of the wireless device 10 via the client $PC_{LAN}$, and to acquire information of the location input into the client $PC_{LAN}$. The receiving server 16b can be realized by a web server using http protocol, for example.

Further, the geographic coordinate acquiring unit 17 of this embodiment has a storage part 17a, an input support part 17b, a falseness judging part 17c and a database access part (DB access part) 17d.

The storage part 17a is formed of a nonvolatile memory or the like, for example, and stores data used by the input support part 17b and the falseness judging part 17c for judgment and the like, the acquired geographic coordinates and the like. The input support part 17b has a function of detecting an incorrect input of the information regarding the location received by the interface 16a or the receiving server 16b, and receiving re-input of the information. The falseness judging part 17c has a function of judging whether the information regarding the location received by the interface 16a or the receiving server 16b is true. The database access part 17d has a function of sending information regarding the location judged as true after correcting the incorrect input, to the geographic coordinate server 20 as a query, and storing geographic coordinates received from the geographic coordinate server 20 in the storage part 17a.

Operation of Embodiment

Next, an operation of the wireless device and the system according to the embodiment will be described with reference to FIG. 1 to FIG. 5. The wireless device according to the embodiment determines a frequency to be used and the like, through respective processes regarding reception and verification of location information, acquisition of geographic coordinates, acquisition of permissible frequency, acquisition of neighboring station information, and determination of frequency to be used.

[Reception and Verification of Location Information]

The frequency (band) used by the wireless device 10 of this embodiment overlaps with that of the primary system PS, so that there is a need to set a frequency (band) to be used, in advance of usage. The user inputs, through the interface 16a or the client $PC_{LAN}$, a place name, a house number, a postal code and the like of a location at which the wireless device 10 is used. When the input is conducted through the client $PC_{LAN}$, the receiving server 16b displays a setting form such as illustrated in FIG. 4, on a display of the client $PC_{LAN}$, to thereby prompt the user to perform input of predetermined items. In an example illustrated in FIG. 4, an input of a name of country, a name of prefecture, a name of city, town or village, a house number, a name of apartment building and the like, a full name, an e-mail, a telephone number, a name of Internet service provider (ISP), a postal code and the like, is prompted. The receiving server 16b stores location information inputted into the setting form by the user, and the like, in the storage part 17a of the geographic coordinate acquiring unit 17. At this time, it is also possible that map information is previously stored in the storage part 17a, and after the user inputs information into the setting form, the input support part 17b searches map information corresponding to the input location information stored in the storage part 17a, and displays the map information on the display of the client $PC_{LAN}$, via the receiving server 16b. Accordingly, it is possible to previously prevent an incorrect input of the user. When the user directly inputs the location information into the interface 16a, the interface 16a stores the received location information and the like in the storage part 17a of the geographic coordinate acquiring unit 17 (S101).

When the location information and the like are stored in the storage part 17a, the input support part 17b judges whether or not the input of the location information and the like is performed for the first time (S102).

When the input of the location information and the like is performed for the first time, namely, when the information and the like are newly input (Yes in S102), the input support part 17b judges the presence/absence of contradiction regarding the location information stored in the storage part 17a (S103). This judgment can employ various methods. For example, a table in which a postal code and positional information are contrasted, is previously stored in the storage part 17a, and the input support part 17b can judge whether or not a place name and the like of the location information and a postal code are corresponded to each other by using the table. Specifically, it is possible to prompt the user to correct his/her incorrect input. Meanwhile, it is also possible that the falseness judging part 17c makes inquiries about a consistency between the location information stored in the storage part 17a and a subscriber's address registered in the ISP with respect to the ISP connected to the wireless device 10. In this case, the falseness judging part 17c compares the address registered in the ISP and the location information received by the location receiving unit 16, so that it can judge the authenticity or an incorrect input of the location information. When a contradiction is found in the location information (Yes in S103), the input support part 17b or the falseness judging part 17c erases the location information stored in the storage part 17a, and the location receiving unit 16 prompts the user to input location information and the like again (S101).

[Acquisition of Geographic Coordinates]

When there is no contradiction in the location information (No in S103), the DB access part 17d sends the location information stored in the storage part 17a to the geographic coordinate server 20 (S104).

The geographic coordinate server 20 receives the location information sent by the wireless device 10 (S105) via the ISP and the network NW. Upon receiving the location information, the position converting unit 22 judges whether the received location information is true information (S106). For example, the position converting unit 22 can roughly judge the right/wrong of contents by referring to path information indicating a communication path included in the location information and address information on network of the wireless device 10 or the like, and comparing the information with the location information. Similarly, the position converting unit 22 can perform rough judgment also by comparing identification information inherent in the wireless device 10 such as MAC address, for example, with the location information.

When, as a result of the judgment, it is not certain whether the location information is true or not (No in S106), the position converting unit 22 sends an error signal to the wireless device 10 (S107) as a reply. The wireless device 10 that receives the error signal prompts the user to input location information again (S101).

When the location information is true information as a result of the judgment (Yes in S106), the position converting unit 22 searches in the geographic information database 23 based on the location information, and acquires corresponding geographic coordinates (S108). Upon acquiring the geographic coordinates, the position converting unit 22 sends the acquired geographic coordinates to the wireless device 10 as a reply (S109). The wireless device 10 receives the geographic coordinates via the network NW and the ISP (S110).

[Acquisition of Already-Assigned Frequency]

Upon receiving the geographic coordinates, the DB access part 17*d* stores the received geographic coordinates in the storage part 17*a*, and the access frequency setting unit 18 transmits the geographic coordinates to the frequency server 30 as a query (S111). Note that also in a case where the location information is not input for the first time in step S102 (No in S102), since the geographic coordinates are already stored in the storage part 17*a*, the access frequency setting unit 18 transmits the geographic coordinates to the frequency server 30 as a query.

The frequency server 30 receives the geographic coordinates sent by the wireless device 10 via the ISP and the network NW (S112). Upon receiving the geographic coordinates, the frequency searching unit 32 registers the received geographic coordinates together with the identification information of the wireless device 10, in the frequency database 33 (S113), and searches information of frequency (band) of the primary system PS existed in the corresponding area (S114) stored in the frequency database 33 based on the geographic coordinates as a query. Specifically, the frequency (band) which is already assigned to the primary system PS in the area, is searched.

When the already-assigned frequency (band) is acquired, the frequency searching unit 32 generates permission information indicating a frequency (band) capable of being used by the wireless device 10 (S115), and transmits the information to the wireless device 10 (S116). Note that when there is no frequency (band) capable of being used by the wireless device 10 in the area, information indicating non-permission is generated. The wireless device 10 receives assignment information via the network NW and the ISP (S117).

[Acquisition of Neighboring Station Information]

Upon receiving the permission information, the neighboring station information acquiring unit 19 reads the geographic coordinates from the storage part 17*a*, and transmits the geographic coordinates to the wireless station server 40 as a query (S118).

The wireless station server 40 receives, via the ISP and the network NW, the geographic coordinates sent by the wireless device 10 (S119). Upon receiving the geographic coordinates, the neighboring station searching unit 42 searches neighboring station information regarding another wireless device existed in the corresponding area and using the frequency (band) of the primary system PS and a frequency (band) used by the wireless device (S120) stored in the neighboring station database 43 based on the geographic coordinates as a query. Specifically, the presence/absence of another wireless device that uses the frequency (band) assigned to the primary system PS in the area with a priority lower than that of the primary system PS, is searched.

When the neighboring station information in the area is acquired, the neighboring station searching unit 42 transmits the neighboring station information to the wireless device 10 (S121). The wireless device 10 receives the neighboring station information via the network NW and the ISP (S122).

[Determination of Frequency to be Used]

Upon receiving the neighboring station information, the neighboring station information acquiring unit 19 gives the received neighboring station information to the access frequency setting unit 18, and the access frequency setting unit 18 determines a frequency (band) used by the receiving unit 11 and the transmitting unit 12 based on the permission information and the neighboring station information (S123). For example, in a case where channels A, B, C, D and E are tentatively provided as frequencies used by the receiving unit 11 and the transmitting unit 12, and if the permission information includes the channels A, B and E, and the neighboring station information includes the channels A, B and C, the channels which can be used are A, B and E based on a relation with the primary system PS, and the channels which cannot be used are A, B and C based on a relation with neighboring another wireless device. Specifically, the channel which is not used by the neighboring station and which is not assigned to the primary system PS can be determined as E. Note that there is no problem if the access frequency setting unit 18 determines a transmission power of the transmitting unit 12, in addition to the frequency (band) used by the receiving unit 11 and the transmitting unit 12. At this time, the access frequency setting unit 18 can acquire positional information of the neighboring station from the neighboring station information, and determine the transmission power based on a distance between the neighboring station and the wireless device 10.

When the frequency and the like used by the wireless device 10 are determined, the neighboring station information acquiring unit 19 transmits the determined frequency and the like to the wireless station server 40 (S124). The wireless station server 40 receives the determined frequency and the like via the ISP and the network NW (S125).

Upon receiving the frequency and the like determined to be used from the wireless device 10, the neighboring station searching unit 42 registers the identification information of the wireless device 10 and information of the frequency to be used and the like, in the neighboring station database 43 as new neighboring station information (S126). When the pieces of information are registered in the neighboring station database 43, the neighboring station searching unit 42 notifies the wireless device 10 that the registration is conducted (S127).

When the frequency to be used and the like are registered in the neighboring station database 43 of the wireless station server 40, the access frequency setting unit 18 sets a frequency and transmitting power used by the receiving unit 11 and the transmitting unit 12 via the access point controlling unit 15 (S128).

As described above, the wireless device according to the embodiment includes the geographic coordinate acquiring unit which accesses the geographic coordinate server, so that even if the user does not know the geographic coordinates capable of being received by the frequency server, it is possible to easily select the frequency which does not interfere with that of the primary system. Further, the wireless device according to the embodiment is set to be able to access not only the frequency server that manages the frequency information of the primary system but also the wireless station server that manages the information of neighboring wireless device whose priority is lower than that of the primary system, so that it is possible to easily set the frequency which does not cause the interference.

Note that the present invention is not limited to the above-described embodiment as it is, and in the implementation phase, the present invention can be embodied with components being modified in the range not departing from the gist of the invention. For example, in the above-described embodiment, the setting of frequency and the like is conducted based on the permission information indicating the absence of primary system PS and the neighboring station information indicating the presence of another wireless station, but, the present invention is not limited to this. It is also possible to perform the setting of frequency and the like by utilizing non-permission information indicating the presence of primary system PS and non-utilization information indicating the absence of another wireless station, or by combining these pieces of information. Further, in the above-described embodiment, the geographic coordinate acquiring unit accesses the geographic coordinate server to acquire the geographic positional information, but, the present invention is not limited to this as well. There is no problem if a geographic coordinate server function is built in the wireless device 10, and the geographic coordinate acquiring unit directly performs conversion from the location information into the geographic positional information. Further, various inventions can be formed by appropriately combining plural components disclosed in the above-described embodiment. For example, some components may be deleted from all the components shown in the embodiment. Further, components ranging across different embodiments may be combined appropriately.

What is claimed is:

1. A wireless device in a second wireless system using a second frequency band overlapped with a first frequency band allocated for a first wireless system, the second wireless system having lower priority to use the first frequency band than the first wireless system, the wireless device comprising:
    a location receiving unit configured to receive location information having a place name and indicating a location of the wireless device;
    a geographic coordinate acquiring unit configured to acquire geographic coordinates including latitude and longitude based on the location information;
    a frequency setting unit configured to access a frequency server storing a frequency assigned to a wireless device of the first wireless system and corresponding geographic coordinates thereof including latitude and longitude by using the geographic coordinates acquired by the geographic coordinate acquiring unit, so as to acquire at least one of a frequency not assigned to the wireless device of the first wireless system and a frequency having low risk of interfering with the wireless device of the first wireless system in the second frequency band overlapped with the first frequency band, to set the frequency as a transmission/reception frequency; and
    a falseness judging unit configured to judge an authenticity of the location information received by the location receiving unit, by accessing a network provider connected to the wireless device to serve to perform access to the frequency server.

2. The wireless device according to claim 1, further comprising
    a neighboring station information acquiring unit configured to access a wireless station server storing a frequency used by a wireless device of the second wireless system and corresponding geographic coordinates thereof including latitude and longitude by using the geographic coordinates acquired by the geographic coordinate acquiring unit, so as to acquire use information indicating at least one of a frequency used by the wireless device of the second wireless system and a frequency having low risk of interfering with the wireless device of the second wireless system in the second frequency band, wherein
    the frequency setting unit determines the transmission/reception frequency based on the frequency acquired from the frequency server and the use information.

3. The wireless device according to claim 2, wherein
    the frequency setting unit accesses the frequency server and the wireless station server, and then registers the transmission/reception frequency determined based on the frequency acquired from the frequency server and the use information, in the wireless station server.

4. The wireless device according to claim 1, wherein:
    the frequency server stores a frequency assigned to the wireless device of the first wireless system and corresponding geographic coordinates thereof including latitude, longitude and altitude; and
    the geographic coordinate acquiring unit acquires, based on the location information, geographic coordinates including latitude, longitude and altitude corresponding to the location information.

5. The wireless device according to claim 1, wherein
    the geographic coordinate acquiring unit accesses a geographic coordinate server storing place information including the place name and corresponding geographic coordinates thereof including latitude and longitude, to acquire the geographic coordinates corresponding to the location information.

6. The wireless device according to claim 1, wherein
    the geographic coordinate acquiring unit acquires the geographic coordinates when the falseness judging unit judges that the location information received by the location receiving unit is true.

7. A communication method performed by a wireless device in a second wireless system using a second frequency band overlapped with a first frequency band allocated for a first wireless system, the second wireless system having lower priority to use the first frequency band than the first wireless system, the communication method comprising:
    a location receiving step of receiving location information having a place name and indicating a location of the wireless device;
    a geographic coordinate acquiring step of accessing a geographic coordinate database converting a place information to corresponding geographic coordinates thereof to acquire geographic coordinates including latitude and longitude by use of the location information;
    a frequency information acquiring step of accessing a frequency server storing a frequency assigned to a wireless device of the first wireless system and corresponding geographic coordinates thereof including latitude and longitude by using the geographic coordinates acquired in the geographic coordinate acquiring step, and acquiring permission information indicating at least one of a frequency not assigned to the wireless device of the first wireless system and a frequency having low risk of interfering with the wireless device of the first wireless system in the second frequency band overlapped with the first frequency band;

a frequency setting step of setting a transmission/reception frequency based on the permission information acquired in the frequency information acquiring step; and a falseness judging step of judging an authenticity of the location information received by the location receiving step, by accessing a network provider connected to the wireless device to serve to perform access to the frequency server.

8. The communication method according to claim 7, further comprising a wireless station information acquiring step of accessing a wireless station server storing a frequency used by a wireless device of the second wireless system and corresponding geographic coordinates thereof including latitude and longitude by using the geographic coordinates acquired in the geographic coordinate acquiring step, and acquiring in-use information indicating at least one of a frequency not used by the wireless device of the second wireless system and a frequency having low risk of interfering with the wireless device of the second wireless system in the second frequency band, wherein the frequency setting step determines the transmission/reception frequency based on the permission information acquired in the frequency information acquiring step and the in-use information acquired in the wireless station information acquiring step.

9. The communication method according to claim 7, wherein the geographic coordinate acquiring step performs acquiring the geographic coordinates when the result of the falseness judging step indicates that the location information received by the location receiving step is true.

* * * * *